United States Patent [19]

Dang et al.

[11] Patent Number: 5,416,731

[45] Date of Patent: May 16, 1995

[54] HIGH-SPEED BARREL SHIFTER

[75] Inventors: Keith D. Dang; Donald C. Anderson, both of Austin, Tex.

[73] Assignee: Motorola, Inc., Schaumburg, Ill.

[21] Appl. No.: 292,445

[22] Filed: Aug. 18, 1994

Related U.S. Application Data

[63] Continuation of Ser. No. 990,137, Dec. 14, 1992, abandoned.

[51] Int. Cl.6 .................................................. G06F 5/01
[52] U.S. Cl. .................................................. 364/715.08
[58] Field of Search ...................................... 364/715.08

[56] References Cited

U.S. PATENT DOCUMENTS

| | | | |
|---|---|---|---|
| 4,583,197 | 4/1986 | Chappell et al. | 364/715.08 |
| 4,807,172 | 2/1989 | Nukiyama | 364/715.08 |
| 4,827,441 | 5/1989 | Someshwar et al. | 364/715.08 |
| 4,829,460 | 5/1989 | Ito | 364/715.08 |
| 4,999,796 | 3/1991 | DeWitt et al. | 364/715.08 |
| 5,099,445 | 3/1992 | Studor et al. | 364/715.08 |
| 5,155,698 | 10/1992 | Niimi | 364/715.08 |

FOREIGN PATENT DOCUMENTS

0324374A2 7/1989 European Pat. Off.

OTHER PUBLICATIONS

G. T. Paul and J. F. Dirac, "Column Shifter," IBM Technical Disclosure Bulletin, vol. 4, No. 10, Mar. 1962, pp. 79-80.

Primary Examiner—David H. Malzahn
Attorney, Agent, or Firm—Paul J. Polansky

[57] ABSTRACT

A high-speed barrel shifter (20) includes a shifter array (25) having a matrix of transistors (40) located at intersections of rows and columns of the matrix (40). The rows and columns alternately function as source and destination terminals. A fill portion (48) fills either a predetermined value or a data-dependent value such as a sign bit into vacated bit positions along rows in a bottom left portion (42). Thus the barrel shifter (20) can perform a data-dependent fill instruction within the shifter array (25) and avoids extra clock cycles associated with post-array processing. In one embodiment, an isolation portion (44, 45) separates a top right portion (41) of the matrix (40) from the bottom left portion (42) along a diagonal (43). The isolation portion (44, 45) isolates transistors in the bottom left portion (42), which are associated with rotates and fills, from transistors in the top right portion (41), which are associated with shifts, according to the direction of the shift.

23 Claims, 3 Drawing Sheets

HIGH-SPEED BARREL SHIFTER

This application is a continuation of prior application Ser. No. 07/990,137, filed Dec. 14, 1992, now abandoned.

FIELD OF THE INVENTION

This invention relates generally to arithmetic circuits, and more particularly, to barrel shifters.

BACKGROUND OF THE INVENTION

A data processor requires a variety of shift operations to implement its instruction set. These shift operations include left shifts, right shifts, and rotates. The rotate shifts the bit positions in the indicated direction but instead of causing the bits to "roll off" the end, the rotate wraps the bits around and shifts them into vacated bit positions at the other end. Left and right shifts can be arithmetic or logical, a characteristic which determines how bits at either end of the operand are handled. Each shift operation has a variable length. Which bit is shifted into a given bit position is determined by the type of shift operation. During the left or right shift, bits roll off the end and vacated bit positions must be filled with something. For example, the vacated bit positions may be filled with zero, one, the carry bit, or the sign bit, depending on the instruction type. A fill using the sign bit or the carry bit is called data-dependent because the value with which to fill the vacated bit positions cannot be determined ahead of time.

Several types of shifters are known in the art. A simple shift register stores an input operand in parallel, and then shifts the operand serially by one bit position for each clock cycle. When the operand has been shifted by the desired number of bits, the result is read out of the shift register in parallel. While the shift register requires only a small amount of integrated circuit area, a shift operation using a shift register requires multiple clock cycles and is generally not useful for high-speed data processing.

A second type of shifter, taught by Chas F. Studor and Robert Skruhak in U.S. Pat. No. 5,099,445, shifts the input operand by either one or a predetermined number of bit positions. Using this type of shifter, a long shift can be accomplished in a fewer number of clock cycles than for the shift register. While this shifter is much faster than the shift register, it requires more integrated circuit area to selectively connect each bit to both adjacent bits and to bits separated by the predetermined number of bit positions.

A third type of shifter which is yet faster is a barrel shifter. The barrel shifter includes connections from each bit of a source operand to each bit of a destination operand. Thus, the barrel shifter can perform a shift instruction by any arbitrary number of bit positions within a single clock cycle. Barrel shifters conventionally include two registers each of which function as either the source register or the destination register of the shift operation, depending on the direction. The source and destination registers are coupled to a shifter array, which is essentially an M-by-M matrix of transistors, where M is the operand size. For example, a 66-by-66 bit barrel shifter is taught by Ashok Someshwar and Bernard Pappert in U.S. Pat. No. 4,827,441, entitled "Barrel Shifter".

However, barrel shifters must sacrifice additional integrated circuit area and additional power consumption for the improved speed because of the large number of interconnections required. In addition, known barrel shifters require an additional clock cycle and additional hardware to perform data-dependent fills. What is needed is a barrel shifter architecture with reduced integrated circuit area which performs data-dependent fills more quickly.

SUMMARY OF THE INVENTION

Accordingly, there is provided, in one form, a high-speed barrel shifter comprising a plurality of rows and a plurality of columns crossing the rows. A selected one of the rows and the columns functions as a source terminal and receives an input operand thereon. Another one of the rows and the columns functions as a destination terminal and provides an output operand thereon. The barrel shifter also comprises a plurality of transistors and a fill portion. The plurality of transistors are located at intersections of the rows and the columns. Each transistor has a first current electrode coupled within a corresponding row, a control electrode for receiving a corresponding control signal of a plurality of control signals, and a second current electrode coupled within a corresponding column. The fill portion is coupled to the plurality of rows, and couples a data-dependent value to at least two of the plurality of rows in response to a predetermined shift instruction. The data-dependent value is determined by the predetermined shift instruction. There is provided in another form a high-speed barrel shifter comprising a plurality of rows and a plurality of columns crossing the rows. A selected one of the rows and the columns functions as a source terminal and receives an input operand thereon. Another one of the rows and the columns functions as a destination terminal and provides an output operand thereon. The barrel shifter also comprises a plurality of transistors and a fill portion. The plurality of transistors are located at intersections of the rows and the columns. Each transistor has a first current electrode coupled within a corresponding row, a control electrode for receiving a corresponding control signal of a plurality of control signals, and a second current electrode coupled within a corresponding column. The fill portion is coupled to the plurality of rows, and couples a predetermined value to at least one of the plurality of rows in response to a predetermined shift instruction. The predetermined value is determined by the predetermined shift instruction.

These and other features and advantages will be more clearly understood from the following detailed description taken in conjunction with the accompanying drawings.

DETAILED DESCRIPTION OF A PREFERRED EMBODIMENT

Figure 1:
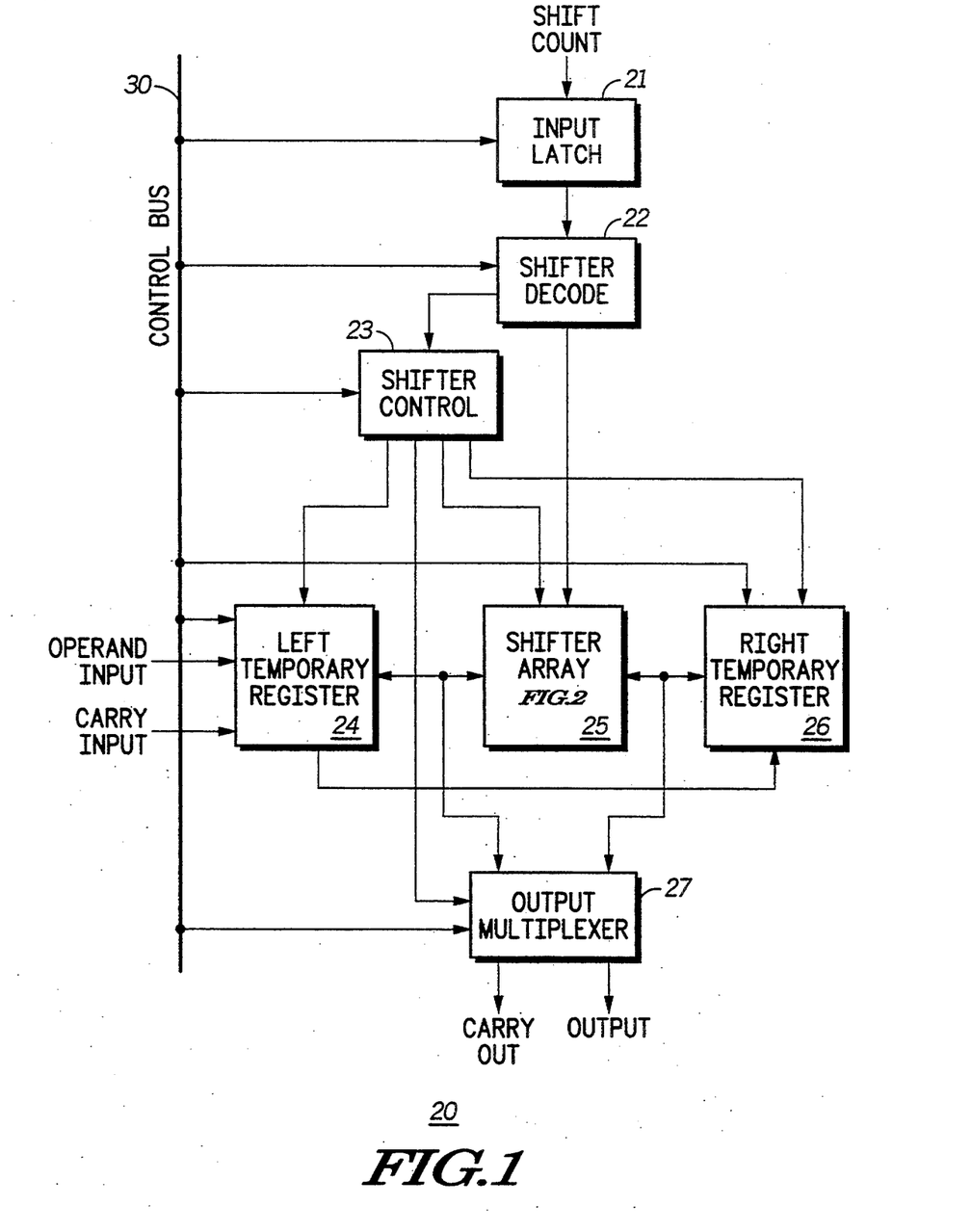
FIG. 1 illustrates in block diagram form a barrel shifter in accordance with the present invention.

FIG. 1 illustrates in block diagram form a barrel shifter 20 in accordance with the present invention. Barrel shifter 20 is connected to a control bus 30 and includes generally an input latch 21, a shifter decode block 22, a shifter control block 23, a left temporary register 24, a shifter array 25, a right temporary register 26, and an output multiplexer 27. Input latch 21 receives an encoded "SHIFT COUNT" and is connected to control bus 30. Shifter decode block 22 receives an output of input latch 21, and is connected to control bus 30. Shifter control block 23 receives a first output of shifter decode block 22, and is connected to control bus 30. Left temporary register 24 receives a first output of shifter control block 23, an "OPERAND INPUT", a "CARRY INPUT", and is connected to control bus 30. Shifter array 25 receives a second output of shifter decode block 22 and a second output of shifter control block 23, and is connected to a bidirectional data path connected between shifter array 25 and left temporary register 24. Right temporary register 26 receives a third input from shifter control block 23, and is connected to control bus 30, to left temporary register 24 for receiving OPERAND INPUT after OPERAND INPUT is latched in left temporary register 24, and to a bidirectional data path connected between shifter array 25 and right temporary register 26. Output multiplexer 27 receives a fourth output of shifter control block 23, and is connected to control bus 30, the bidirectional data path connected between shifter array 25 and left temporary register 24, and the bidirectional data path connected between shifter array 25 and right temporary register 26.

Input latch 21 latches the SHIFT COUNT, which is a two's complement encoded number representing the number of bits to be shifted for the present operation. Shifter decode block 22 receives the latched SHIFT COUNT and controls the shift selection depending on the type of shift instruction and the SHIFT COUNT. Shifter decode block 23 decodes both negative and positive values of SHIFT COUNT to provide an absolute, unsigned integer count to shifter array 25. Thus, only one of the decoded integer shift count signals is active to select a corresponding line in shifter array 25, and the remaining signals are inactive.

Shifter control block 23 controls shifter array 25 and the left and right temporary registers. If the sign bit of SHIFT COUNT is a logic high (indicating a negative number in two's complement notation), then shifter control 23 provides control block signals to shifter array 25 to perform a right shift; if a logic low (indicating a positive number in two's complement notation), shifter control block 23 provides control signals to perform a left shift. Shifter control 23 also recognizes zero fill and replication of the sign bit and controls shifter array 25 accordingly.

Barrel shifter 20 also includes two temporary registers 24 and 26, which alternately provide the source operand of the shift operation in accordance with the direction of the shift. For a right shift, left temporary register 24 provides the source operand; for a left shift, right temporary register 26 provides the source operand. Temporary registers 24 and 26 also include additional combinatorial logic to implement shift functions which cannot be performed in shift array 25 alone. Shifter array 25 provides the destination operand at its output. Shifter array 25 provides the output to the bidirectional data path between shifter array 25 and left temporary register 24 during a left shift, and to the bidirectional data path between shifter array 25 and right temporary register 26 during a right shift. Shifter control 23 selects the destination operand at either the first-or second input of output multiplexer 27 according to the direction of the shift, and output multiplexer 27 provides the OUTPUT and CARRY in response thereto. In the illustrated embodiment, left temporary register 24 and right temporary register 26 also become a destination and provide a lower eight bits of the output of shifter array 25 during certain shift operations. It should be apparent that other embodiments may use temporary registers 24 and 26 as destinations of the entire output, or not as destinations at all.

In the illustrated embodiment, shifter array 25 includes an M-by-M array of N-channel MOS transistors, where M is the operand size. In accordance with the present invention, shifter array 25 also includes a row of N-channel pulldown transistors along a bottom edge, a column of multiplexers along a left edge to perform zero fill or sign bit replication, and additional pass transistors along a diagonal line of shifter array 25 to control the direction of the shifter. By using pass transistors along the diagonal line, shifter array 25 provides isolation between the shift and rotate/fill transistors and allows bidirectional shifts and rotates. By using pulldown devices along the bottom edge and multiplexers along the left edge, shifter array 25 performs sign fill and zero fill operations within the array.

Figure 2:
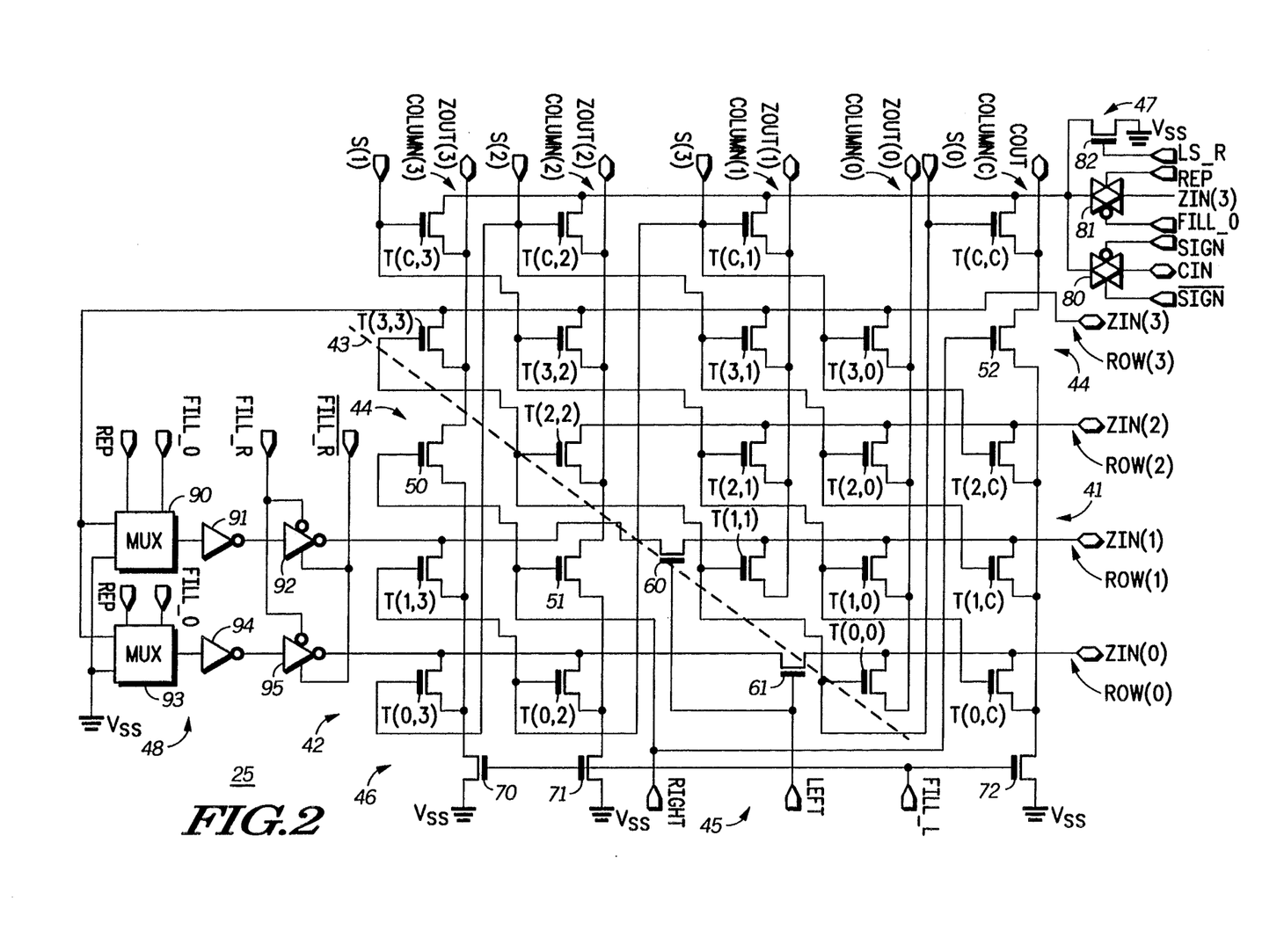
FIG. 2 illustrates in partial schematic form and partial block diagram form one embodiment of the shifter array of FIG. 1.

FIG. 2 illustrates in partial schematic form and partial block diagram form one embodiment of shifter array 25 of FIG. 1. Shifter array 25 includes generally a transistor matrix 40, a zero-fill portion 46, a control portion 47, and a fill portion 48. Matrix 40 includes a top right portion 41 and a bottom left portion 42 separated by a diagonal 43, left isolation transistors 44, and right isolation transistors 45.

Matrix 40 is used to implement a variety of shift operations on a four-bit operand having an additional carry bit. Matrix 40 includes generally transistors T(i, j) located at intersections of rows designated "ROW(i)" and columns designated "COLUMN(j)", where i has a value of (C, 3, 2, 1, 0) and j has a value of (3, 2, 1, 0, C), where C represents the carry bit position. ROW(C) includes transistors T(C, 3), T(C, 2), T(C, 1), and T(C, C). ROW(3) includes transistors T(3, 3), T(3, 2), T(3, 1), and T(3, 0). ROW(2) includes transistors T(2, 2), T(2, 1), T(2, 0), and T(2, C). ROW(1) includes transistors T(1, 3), T(1, 1), T(1, 0), and T(1, C). ROW(0) includes transistors T(0, 3), T(0, 2), T(0, 0), and T(0, C). COLUMN(3) includes transistors T(C, 3), T(3, 3), T(1, 3), and T(0, 3). COLUMN(2) includes transistors T(C, 2), T(3, 2), T(2, 2), and T(0, 2). COLUMN(1) includes transistors T(C, 1), T(3, 1), T(2, 1), and T(1, 1). COLUMN(0) includes transistors T(3, 0), T(2, 2), T(1, 0), and T(0, 0). COLUMN(C) includes transistors T(C, C), T(2, C), T(1, C), and T(0, C).

During a right shift operation, signals labelled "ZIN(3)", "ZIN(2)", "ZIN(1)" and ZIN(0), are received as inputs on ROW(3), ROW(2), ROW(1), and ROW(0), respectively. ROW(C) alternately receives a binary zero, ZIN(3), or a signal labelled "CIN" as an input depending on the shift operation. Signals labelled "ZOUT(3)", "ZOUT(2)", "ZOUT(1)", ZOUT(0), and "COUT" are provided as outputs from COLUMN(3), COLUMN(2), COLUMN(1), COULMN(0), and COLUMN(C), respectively. During a left shift operation, the functions of ZOUT(i) and ZIN(j) are reversed.

Shifter decode block 22 of FIG. 1 provides decoded shift count signals labelled "S(0)", "S(1)", "S(2)", and "S(3)" which correspond to shifts of zero, one, two, and three bits, respectively. Shifter control block 23 of FIG.

1 provides several control signals relevant to the operation of shifter array 25 which are detailed below in TABLE I:

TABLE I

| Control Signal Name | Description |
| --- | --- |
| LEFT | perform a left shift |
| RIGHT | perform a right shift |
| SIGN | sign bit |
| $\overline{\text{SIGN}}$ | complement of SIGN |
| REP | fill higher order bit positions with sign bit |
| FILL_0 | fill higher order bit positions with a value of 0 |
| FILL_R | fill vacated bit positions on left during right shift |
| $\overline{\text{FILL\_R}}$ | complement of FILL_R |
| FILL_L | fill vacated bit positions on right during left shift |
| LS_R | logical shift right |

Each transistor in top right portion 41 and bottom left portion 42 has a first current electrode connected within a corresponding row, a gate for receiving an associated decoded shift count signal, and a second current electrode connected within a corresponding column. In describing transistors as being "within" a corresponding row and column it is to be understood that transistors in bottom left portion 42 have first current electrodes separated from the corresponding ZIN signal by right isolation transistors 45, and second current electrodes separated from the corresponding ZOUT signals by right isolation transistors 44. Note that the terms "first current electrode" and "second current electrode" are used because the source and drain designation depends on the voltages applied.

Diagonal 43 is located immediately to the bottom and left of transistors T(N, N). Diagonal 43 is an imaginary line which separates transistors in top right portion 41 from those in bottom left portion 42. Transistors in top right portion 41 are used for data shifting. Data shifting occurs for those source bits which are shifted to some other bit position in the destination (i.e., do not roll off). Transistors in bottom left portion 42 are used for two purposes. First, they are used for rotates, in which a source bit is shifted out one end and shifted in the other end of the destination. Second, they are used for fills, in which certain values fill vacant bit positions.

In COLUMN(3), transistor T(C, 3) has a first current electrode connected to control portion 47, a gate for receiving signal S(1), and a second current electrode for providing signal ZOUT(3). Transistor T(3, 3) has a first current electrode for receiving signal ZIN(3), a gate for receiving signal S(0), and a second current electrode for providing signal ZOUT(3). Transistor T(1, 3) has a first current electrode connected to fill portion 48, a gate for receiving signal S(3), and a second current electrode. Transistor T(0, 3) has a first current electrode connected to fill portion 48, a gate for receiving signal S(2), and a second current electrode connected to the second current electrode of transistor T(1, 3).

In COLUMN(2), transistor T(C, 2) has a first current electrode connected to control portion 47, a gate for receiving signal S(2), and a second current electrode for providing signal ZOUT(2). Transistor T(3, 2) has a first current electrode for receiving signal ZIN(3), a gate for receiving signal S(1), and a second current electrode for providing signal ZOUT(2). Transistor T(2, 2) has a first current electrode for receiving signal ZIN(2), a gate for receiving signal S(0), and a second current electrode for providing signal ZOUT(2). Transistor T(0, 2) has a first current electrode connected to the first current electrode of transistor T(0, 3) and to fill portion 48, a gate for receiving signal S(3), and a second current electrode.

In COLUMN(1), transistor T(C, 1) has a first current electrode connected to control portion 47, a gate for receiving signal S(3), and a second current electrode for providing signal ZOUT(1). Transistor T(3, 1) has a first current electrode for receiving signal ZIN(3), a gate for receiving signal S(2), and a second current electrode for providing signal ZOUT(1). Transistor T(2, 1) has a first current electrode for receiving signal ZIN(2), a gate for receiving signal S(1), and a second current electrode for providing signal ZOUT(1). Transistor T(1, 1) has a first current electrode for receiving signal ZIN(1), a gate for receiving signal S(0), and a second current electrode for providing signal ZOUT(1).

In COLUMN(0), transistor T(3, 0) has a first current electrode for receiving signal ZIN(3), a gate for receiving signal S(3), and a second current electrode for providing signal ZOUT(0). Transistor T(2, 0) has a first current electrode for receiving signal ZIN(2), a gate for receiving signal S(2), and a second current electrode for providing signal ZOUT(0). Transistor T(1, 0) has a first current electrode for receiving signal ZIN(1), a gate for receiving signal S(1), and a second current electrode for providing signal ZOUT(0). Transistor T(0, 0) has a first current electrode for receiving signal ZIN(0), a gate for receiving signal S(0), and a second current electrode for providing signal ZOUT(0).

In COLUMN(C), transistor T(C, C) has a first current electrode connected to control portion 47, a gate for receiving signal S(0), and a second current electrode for providing signal COUT. Transistor T(2, C) has a first current electrode for receiving signal ZIN(2), a gate for receiving signal S(3), and a second current electrode. Transistor T(1, C) has a first current electrode for receiving signal ZIN(1), a gate for receiving signal S(2), and a second current electrode connected to the second current electrode of transistor T(2, C). Transistor T(0, C) has a first current electrode for receiving signal ZIN(0), a gate for receiving signal S(1), and a second current electrode connected to the second current electrode of transistor T(2, C).

Left isolation transistors 44 include N-channel transistors 50–52. Transistor 50 is serially connected within COLUMN(3) and has a first current electrode for providing signal ZOUT(3), a gate for receiving signal RIGHT, and a second current electrode connected to the second current electrode of transistor T(1, 3). Transistor 51 is serially connected within COLUMN(2) and has a first current electrode for providing signal ZOUT(2), a gate for receiving signal RIGHT, and a second current electrode connected to the second current electrode of transistor T(0, 2). Transistor 52 is serially connected within COLUMN(C) and has a first current electrode for providing signal COUT, a gate for receiving signal RIGHT, and a second current electrode connected to the second current electrode of transistor T(2, C).

Right isolation transistors 45 include N-channel transistors 60 and 61. Transistor 60 is serially connected within ROW(l) and has a first current electrode connected to the first current electrode of transistor T(1, 3) and to fill portion 48, a gate for receiving signal LEFT, and a second current electrode for receiving signal ZIN(1). Transistor 61 is serially connected within ROW(0) and has a first current electrode connected to the first current electrodes of transistors T(0, 3) and T(2, 0) and to fill portion 48, a gate for receiving signal LEFT, and a second current electrode for receiving signal ZIN(0).

Zero-fill portion 46 includes N-channel transistors 70–72. Transistor 70 has a drain connected to the second current electrode of transistor 50, a gate for receiving signal FILL_L, and a source connected to a power supply voltage terminal labelled "$V_{SS}$". $V_{SS}$ is a more-negative power supply voltage terminal having a nominal value of zero volts and thus representing a binary zero in positive logic. Transistor 71 has a drain connected to the second current electrode of transistor 51, a gate for receiving signal FILL_L, and a source connected to $V_{SS}$. Transistor 72 has a drain connected to the second current electrode of transistor 52, a gate for receiving signal FILL_L, and a source connected to $V_{SS}$.

Control portion 47 includes transmission gates 80 and 81 and an N-channel transistor 82. Transmission gate 80 has a first signal terminal connected to signal the first current electrodes of transistors T(C, 3), T(C, 2), T(C, 1) and T(C, C), a true control terminal for receiving signal $\overline{SIGN}$, a complement control terminal for receiving signal SIGN, and a second signal terminal for receiving signal CIN. Transmission gate 81 has a first signal terminal connected to the first signal terminal of transmission gate 80, a true control terminal for receiving signal REP, a complement control terminal for receiving signal FILL_0, and a second signal terminal for receiving signal ZIN(3). Transistor 82 has a drain connected to the first signal terminals of transmission gates 80 and 81, a gate for receiving signal LS_R, and a source connected to $V_{SS}$.

Fill portion 48 includes a multiplexer (MUX) 90, an inverter 91, a three-state inverting buffer 92, a MUX 93, an inverter 94, and a three-state inverting buffer 95. MUX 90 has a first input terminal connected to ROW(3), a second input terminal connected to $V_{SS}$, a first control input terminal for selecting the first input for receiving signal REP, a second control input terminal for selecting the second input for receiving signal FILL_0, and an output terminal. Inverter 91 has an input terminal connected to the output terminal of MUX 90, and an output terminal. Three-state inverting buffer 92 has an input terminal connected to the output terminal of inverter 91, a true control input terminal for receiving signal FILL_R, a complement input terminal for receiving signal FILL_R, and an output terminal connected to the first current electrodes of transistors T(1, 3) and 60. MUX 93 has a first input terminal connected to ROW(3), a second input terminal connected to $V_{SS}$, a first control input terminal for selecting the first input for receiving signal REP, a second control input terminal for selecting the second input for receiving signal FILL_0, and an output terminal. Inverter 94 has an input terminal connected to the output terminal of MUX 93, and an output terminal. Three-state inverting buffer 95 has an input terminal connected to the output terminal of inverter 94, a true control input terminal for receiving signal FILL_R, a complement input terminal for receiving signal FILL_R, and an output terminal connected to the first current electrodes of transistors T(0, 3), T(0, 2), and 61.

Diagonal 43 is an imaginary line which separates transistors which are used for shifts and transistors which are used for rotates or fills. In this context, "shift" represents a movement of a bit from a source bit position to a destination bit position in the indicated direction by a number of bit positions indicated by the SHIFT COUNT. A "rotate" represents a movement of a bit which is "rolled off" one end of the source bit position to a bit position near the opposite end of the destination; in other words, a rotate represents a movement in a direction opposite the indicated direction. A "fill" represents a substitution of some value into a vacated destination bit position. The value may be a predetermined value, such as a zero-fill, or a data-dependent value, such as the value of the sign bit.

The detailed operation of shifter array 25 may be understood by an examining several different shift operations. An arithmetic shift left (ASL) shifts the lower order bits into higher order bits by an amount determined by the SHIFT COUNT and fills the vacated low-order bit positions with zeros. In an arithmetic shift left by two, control signals S(2), FILL_L, and LEFT are active, and all other control signals are inactive. Active signal LEFT makes transistors 60 and 61 conductive and inactive signal RIGHT makes transistors 50, 51, and 52 nonconductive, isolating transistors in bottom left portion 42 from their respective columns. Since decoded shift count signal S(2) is active, transistors T(C, 2), T(3, 1), T(2, 0), and T(1, C) in top right portion 41, and transistor T(0, 3) in bottom left portion 42, are conductive. Transistor T(C, 2) is conductive and causes source operand bit ZOUT(2) to become destination operand bit CIN; transistor T(3, 1) is conductive and causes source operand bit ZOUT(1) to become destination operand bit ZIN(3); transistor T(2, 0) is conductive and causes source operand bit ZOUT(0) to become destination operand bit ZIN(2); and transistor T(1, C) is conductive and pulldown transistor 72 provides destination operand bit ZIN(1) as an active low (binary zero). Transistor T(0, 3) in bottom left portion 42 is conductive and pulldown transistor 70 provides destination operand bit ZIN(0) as an active low (binary zero). Thus, transistors 70 and 72 in pulldown portion 46 allow the lower two bit positions of the destination operand to be filled with zeros.

An arithmetic shift right (ASR) shifts the higher order bits into lower order bits by an amount determined by the SHIFT COUNT and fills the vacated high-order bit positions with the value of the most-significant (sign) bit. In an arithmetic shift right by two, control signals S(2), REP, FILL_R, FILL_R, and RIGHT are active, and all other control signals are inactive. Active signal RIGHT makes transistors 50–52 conductive and inactive signal LEFT keeps transistors 60 and 61 nonconductive, isolating transistors in bottom left portion 42 from their respective rows. Since decoded shift count signal S(2) is active, transistors T(C, 2), T(3, 1), T(2, 0), and T(1, C) in top right portion 41, and transistor T(0, 3) in bottom left portion 42, are conductive. Transistor T(C, 2) is conductive causes source operand bit ZIN(3) to become destination operand bit ZOUT(2); transistor T(3, 1) is conductive and causes source operand bit ZIN(3) to become destination operand bit ZOUT(1); transistor T(2, 0) is conductive and causes source operand bit ZIN(2) to become destination operand bit ZOUT(0); and transistor T(1, C) is conductive and causes source operand bit ZIN(1) to become destination operand bit COUT. Signal REP causes MUX 93 to select ZIN(3), and transistor T(0, 3) is conductive and causes source operand bit ZIN(3) to become destination operand bit ZOUT(3). Note that the arithmetic shift right is a data-dependent shift operation, since the value shifted into bit positions 3, 2, and 1 depends on the value of the sign bit (ZIN(3)). Shift array 25 performs ASRs within the array during a single clock cycle and thus saves an extra clock cycle associated with known barrel shifters.

To shift array 25, a logical shift left (LSL) is identical to an ASL. A logical shift right (LSR), however, shifts the higher order bits into lower order bits by an amount determined by the SHIFT COUNT and fills the vacated high-order bit positions with zeros. (In the illustrated embodiment, signal CIN is preset to zero.) In a logical shift right by two, control signals S(2), SIGN, SIGN, FILL_0, FILL_R, FILL_R, and RIGHT are active, and all other control signals are inactive. Active signal RIGHT makes transistors 50–52 conductive and inactive signal LEFT keeps transistors 60 and 61 nonconductive, isolating transistors in bottom left portion 42 from their respective rows. Since decoded shift count signal S(2) is active, transistors T(C, 2), T(3, 1), T(2, 0), and T(1, C) in top right portion 41, and transistor T(0, 3) in bottom left portion 42, are conductive. Transistor T(C, 2) is conductive and causes source operand bit CIN to become destination operand bit ZOUT(2); transistor T(3, 1) is conductive and causes source operand bit ZIN(3) to become destination operand bit ZOUT(1); transistor T(2, 0) is conductive and causes source operand bit ZIN(2) to become destination operand bit ZOUT(0); and transistor T(1, C) is conductive and causes source operand bit ZIN(1) to become destination operand bit COUT. Signal FILL_0 causes MUX 93 to select a logical zero, and transistor T(0, 3) is conductive and provides ZOUT(3) as a logical zero. Note that the logical shift right is a sign-dependent shift operation, since the value shifted into bit position 2 depends on the value of CIN. Shift array 25 performs the LSR within the array during a single clock cycle.

Rotary shifts left and right (ROL and ROR, respectively) simply shift the source bits into the destination by wrapping bits which would otherwise roll off around to the other side. During both ROL and ROR shifts, both signals LEFT and RIGHT are active and all of transistors 50–52 and 60–61 are conductive. The only difference between ROL and ROR instructions is that ZIN(j) is used as the source and ZOUT(j) as the destination for RORs, and that ZOUT(j) is used as the source and ZIN(i) is used as the destination for ROLs.

Thus, barrel shifter 20 implements data-dependent fill ASR and LSR shifts within the array and thus within one clock cycle, which improves speed over known barrel shifters. Barrel shifter 20 also has an additional advantage of reducing power consumption during certain shift operations. For example, a shift operation may require only top right portion 41. During such a shift operation, signals LEFT and RIGHT are both inactive and transistors in bottom left portion 42 are nonconductive. As the size of shifter array 25 increases, the power savings during such a shift operation also increases because the size of bottom left portion 42 approaches one-half the size of the array.

Figure 3:
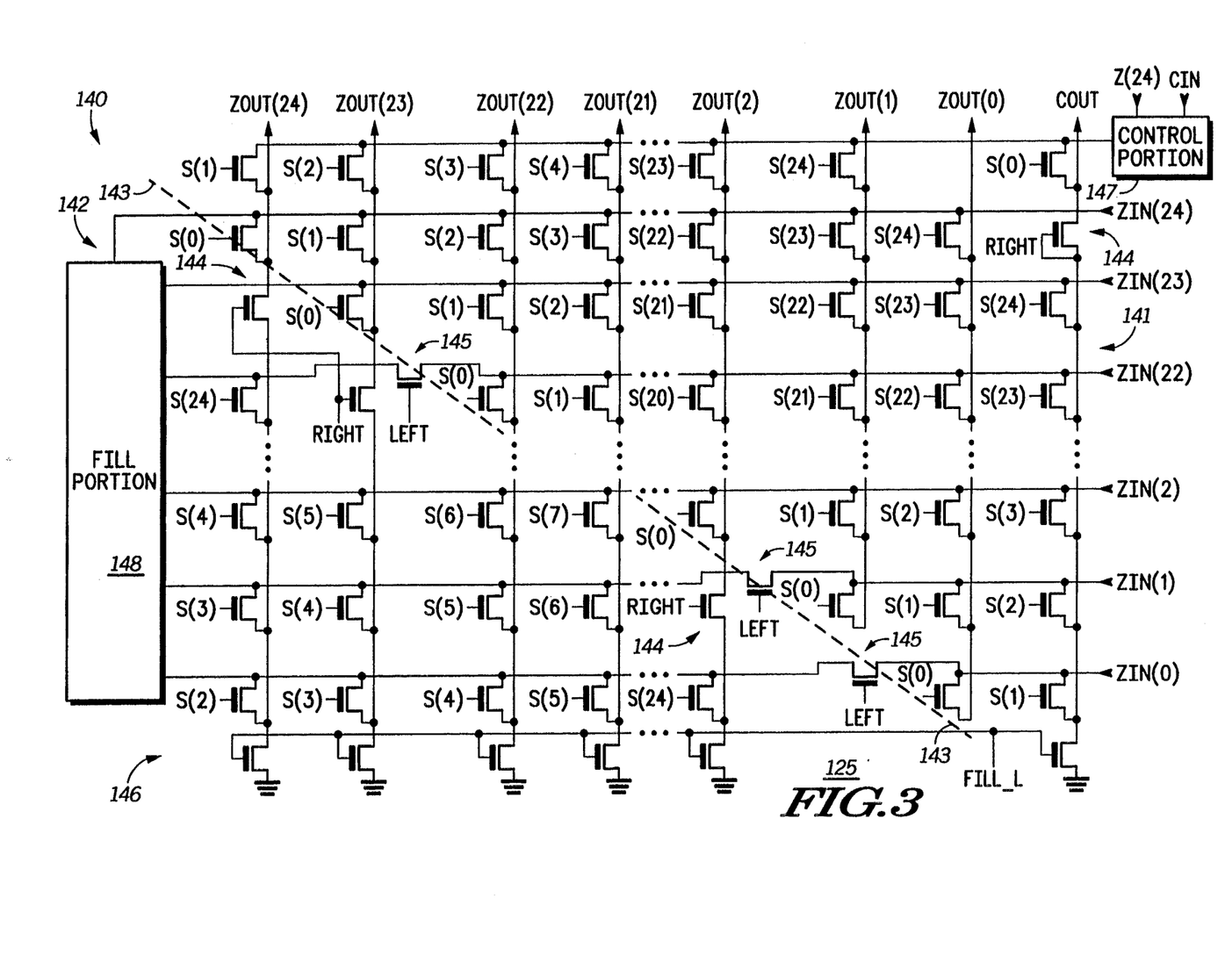
FIG. 3 illustrates in partial schematic form and partial block diagram form a shifter array in accordance with a preferred embodiment of the present invention.

FIG. 3 illustrates in partial schematic form and partial block diagram form a shifter array 125 in accordance with a preferred embodiment of the present invention. In a FIG. 3, the operand size is twenty-five bits with an additional carry bit representing an extension of the operand. Elements in shifter array 125 are given reference numbers corresponding to those of similar or identical elements in shifter array 25. Shifter array 125 includes generally a transistor matrix 140, a zero-fill portion 146, a control portion 147, and a fill portion 148. Matrix 140 includes a top right portion 141 and a bottom left portion 142 separated by a diagonal 143, left isolation transistors 144, and right isolation transistors 145. Shifter array 125 operates similarly to shifter array 25 but performs shift operations on larger operand sizes. An extension of the shifter arrays 25 and 125 to operands of arbitrary sizes should be apparent to those of ordinary skill in the art.

While the invention has been described in the context of a preferred embodiment, it will be apparent to those skilled in the art that the present invention may be modified in numerous ways and may assume many embodiments other than that specifically set out and described above. For example, FIG. 2 describes a shifter array using N-channel transistors; an analogous shifter array using P-channel transistors is also within the scope of the present invention. Also, other transistor types may be possible. While the left and right designations are helpful to understanding the barrel shifter architecture, it should be understood that these designations are arbitrary. Accordingly, it is intended by the appended claims to cover all modifications of the invention which fall within the true spirit and scope of the invention.

We claim:

1. A high-speed barrel shifter comprising:
   a plurality of rows;
   a plurality of columns crossing said rows;
   a selected one of said rows and said columns functioning as a source terminal and receiving an input operand thereon;
   another one of said rows and said columns functioning as a destination terminal and providing an output operand thereon;
   a plurality of transistors located at intersections of said rows and said columns, each transistor having a first current electrode coupled within a corresponding row, a control electrode for receiving a corresponding control signal of a plurality of control signals, and a second current electrode coupled to within corresponding column; and
   fill means coupled to said plurality of rows, for coupling a data-dependent value to at least two of said plurality of rows in response to a predetermined shift instruction;
   said data-dependent value determined by said predetermined shift instruction.

2. The barrel shifter of claim 1 wherein said data-dependent value is a data bit of said input operand.

3. The barrel shifter of claim 2 wherein said data-dependent value is a sign bit of said input operand.

4. The barrel shifter of claim 1 wherein said fill means further couples a predetermined value to said at least one of said plurality of rows in response to a second predetermined shift instruction.

5. The barrel shifter of claim 4 wherein said predetermined value is a binary zero.

6. The barrel shifter of claim 4 wherein said predetermined value is a binary one.

7. The barrel shifter of claim 1 further comprising coupling means for coupling at least one of said plurality of columns to a second predetermined value in response to a third predetermined shift instruction.

8. The barrel shifter of claim 7 wherein said second predetermined value is a binary zero.

9. The barrel shifter of claim 1 wherein said plurality of transistors is further characterized as having a top right portion and a bottom left portion separated by a diagonal, said top right portion for shifting bits of said source into corresponding bits of said destination as determined by a shift count, said bottom left portion for filling at least one vacated bit position of said destination as determined by at least one of said plurality of shift instructions, said barrel shifter further comprising isolation means located along said diagonal, for disabling predetermined ones of said transistors of said bottom left half during at least one of said plurality of shift instructions.

10. The barrel shifter of claim 9 wherein said isolation means comprises:
 a second plurality of transistors serially coupled within said columns and conductive in response to a right shift signal; and
 a third plurality of transistors serially coupled within said rows and conductive in response to a left shift signal.

11. A high-speed barrel shifter comprising:
 a first terminal having a predetermined number of signal lines forming rows of the high speed barrel shifter;
 a second terminal having said predetermined number of signal lines forming columns of the high speed barrel shifter;
 a selected one of said first terminal and said second terminal functioning as a source and receiving an input operand thereon;
 another one of said first terminal and said second terminal functioning as a destination and providing an output operand thereon;
 a matrix of transistors located at intersections of said predetermined number of signal lines of said first terminal and said predetermined number of signal lines of said second terminal, for coupling bits of said source to selected bits of said destination in response to a plurality of shift instructions, said matrix characterized as having a top right portion and a bottom left portion separated by a diagonal;
 said top right portion for shifting bits of said source into corresponding bits of said destination as determined by a shift count;
 said bottom left portion for filling at least one vacated bit position of said destination as determined by at least one of said plurality of shift instructions; and
 isolation means located along said diagonal for isolating predetermined ones of said transistors of said bottom left half from either a corresponding row or a corresponding column selectively in response to at least one control signal.

12. The barrel shifter of claim 11 wherein said isolation means comprises:
 a first plurality of transistors serially coupled within said columns and conductive in response to a right shift signal; and
 a second plurality of transistors serially coupled within said rows and conductive in response to a left shift signal.

13. The barrel shifter of claim 11 wherein said bottom left portion further rotates bits of said source into said at least one vacated bit position of said destination in response to a rotate instruction.

14. The barrel shifter of claim 13 further comprising control means for providing a selected one of said left shift signal and said right shift signal in response to at least one shift instruction, and for providing both said left signal and said right signal in response to said rotate instruction.

15. A high-speed barrel shifter comprising:
 a matrix of transistors located at intersections of a plurality of rows forming a first terminal and a plurality of columns forming a second terminal;
 a selected one of said first and second terminals functioning as a source and receiving an input operand thereon;
 another one of said first and second terminals functioning as a destination and providing an output operand thereon;
 each transistor of said matrix having a first current electrode coupled within a corresponding row, a second current electrode coupled within a corresponding column, and a control electrode for receiving a corresponding one of a plurality of decoded control signals;
 said matrix characterized as having a top right portion and a bottom right portion separated by a diagonal;
 said top right portion for shifting bits of said source into corresponding bits of said destination as determined by a shift count;
 said bottom left portion for filling at least one vacated bit position of said destination as determined by at least one of said plurality of shift instructions; and
 isolation means located along said diagonal for isolating predetermined ones of said transistors of said bottom left portion from either a corresponding row or a corresponding column selectively in response to at least one control signal.

16. The barrel shifter of claim 15 wherein said isolation means comprises:
 a first plurality of transistors serially coupled within said columns and conductive in response to a right shift signal; and
 a second plurality of transistors serially coupled within said rows and conductive in response to a left shift signal.

17. The barrel shifter of claim 16 wherein said bottom left portion further rotates bits of said source into said at least one vacated bit position of said destination in response to a rotate instruction.

18. The barrel shifter of claim 17 further comprising control means for providing a selected one of said left shift signal and said right shift signal in response to at least one shift instruction, and for providing both said left signal and said right signal in response to said rotate instruction.

19. A high-speed barrel shifter comprising:
 a plurality of rows;
 a plurality of columns crossing said rows;
 a selected one of said rows and said columns functioning as a source terminal and receiving an input operand thereon;
 another one of said rows and said columns functioning as a destination terminal and providing an output operand thereon;
 a plurality of transistors located at intersections of said rows and said columns, each transistor having a first current electrode coupled within a corresponding row, a control electrode for receiving a corresponding control signal of a plurality of control signals, and a second current electrode coupled to within corresponding column; and fill means coupled to said plurality of rows, for coupling a predetermined value to at least two of said plurality of rows in response to a predetermined shift instruction;

said predetermined value determined by said predetermined shift instruction.

20. The barrel shifter of claim 19 wherein said predetermined value is a binary zero.

21. The barrel shifter of claim 19 wherein said predetermined value is a binary one.

22. The barrel shifter of claim 19 wherein said plurality of transistors is further characterized as having a top right portion and a bottom left portion separated by a diagonal, said top right portion for shifting bits of said source into corresponding bits of said destination as determined by a shift count, said bottom left portion for filling at least one vacated bit position of said destination as determined by at least one of said plurality of shift instructions, said barrel shifter further comprising isolation means located along said diagonal, for disabling predetermined ones of said transistors of said bottom left half during at least one of said plurality of shift instructions.

23. The barrel shifter of claim 22 wherein said isolation means comprises:
- a second plurality of transistors serially coupled within said columns and conductive in response to a right shift signal; and
- a third plurality of transistors serially coupled within said rows and conductive in response to a left shift signal.

* * * * *